United States Patent
Ellinger et al.

(10) Patent No.: US 7,373,917 B2
(45) Date of Patent: May 20, 2008

(54) METHOD FOR OPERATING A HYBRID VEHICLE

(75) Inventors: Raimund Ellinger, Graz (AT); Wolfgang Kriegler, Graz (AT); Michael Weissbäck, Graz (AT); Peter Ebner, Graz (AT)

(73) Assignee: AVL List GmbH, Graz (AT)

( * ) Notice: Subject to any disclaimer, the term of this patent is extended or adjusted under 35 U.S.C. 154(b) by 183 days.

(21) Appl. No.: 11/216,456

(22) Filed: Sep. 1, 2005

(65) Prior Publication Data

US 2006/0042587 A1   Mar. 2, 2006

(30) Foreign Application Priority Data

Sep. 2, 2004   (AT) .............................. A 1469/2004

(51) Int. Cl.
*F02B 1/14*   (2006.01)
(52) U.S. Cl. .................. 123/295; 123/299; 60/284; 60/295; 60/320
(58) Field of Classification Search ................ 123/295, 123/299; 60/284, 295, 320
See application file for complete search history.

(56) References Cited

U.S. PATENT DOCUMENTS

| | | | |
|---|---|---|---|
| 6,158,413 A | 12/2000 | Kimura et al. | |
| 6,209,672 B1 * | 4/2001 | Severinsky | 180/65.2 |
| 6,301,529 B1 | 10/2001 | Itoyama et al. | |
| 6,338,245 B1 | 1/2002 | Shimoda et al. | |
| 6,570,265 B1 * | 5/2003 | Shiraishi et al. | 290/40 C |
| 2004/0060535 A1 * | 4/2004 | Osawa et al. | 123/198 DB |
| 2004/0237513 A1 * | 12/2004 | Bunting et al. | 60/295 |
| 2006/0169245 A1 * | 8/2006 | Zillmer et al. | 123/299 |

FOREIGN PATENT DOCUMENTS

| | | |
|---|---|---|
| DE | 4239357 | 12/1993 |
| DE | 10348366 | 5/2004 |
| EP | 0943790 | 9/1999 |
| EP | 1007383 | 5/2000 |
| EP | 1288473 | 3/2003 |
| JP | 2003065099 | 3/2003 |

* cited by examiner

*Primary Examiner*—Erick Solis
(74) *Attorney, Agent, or Firm*—Dykema Gossett PLLC

(57) ABSTRACT

The invention relates to a method for operating a hybrid vehicle with a drive train which comprises an internal combustion engine driven by diesel fuel and at least one electric driving machine. In order to reduce the nitrogen oxide and exhaust particulate emissions it is provided that the internal combustion engine is operated with an alternative diesel combustion method in at least one operating range of the vehicle and the electric driving machine is switched in.

13 Claims, 3 Drawing Sheets

METHOD FOR OPERATING A HYBRID VEHICLE

BACKGROUND OF THE INVENTION

The invention relates to a method for operating a hybrid vehicle with a drive train which comprises an internal combustion engine driven by diesel fuel and at least one electric driving machine, as well as a hybrid vehicle for performing this method.

DESCRIPTION OF THE PRIOR ART

Hybrid vehicles which comprise a diesel engine and at least one electric driving machine are known from JP 2003-065099A or EP 1 007 383 B1. In order to ensure an operation of the internal combustion engine with the lowest possible emissions and with the simplest possible means, it is proposed in EP 1 007 383 B1 for example that a time average of the driving torque required during a respective predeterminable time travel is determined by a hybrid drive control unit, and power outputs of the internal combustion engine and the three-phase machine are controlled in such a way that the internal combustion engine outputs driving torque corresponding to the time average determined, and the three-phase machine outputs the difference between the driving torque currently required and the driving torque delivered by the internal combustion engine.

Stricter legal framework conditions require that repeated new approaches must be taken in the design of combustion methods in order to reduce the emission of exhaust particulates and NOx emissions in diesel engines.

It is known to reduce NOx and exhaust particulate emissions in the exhaust gas in that the ignition delay is increased by moving forward the time of injection, so that the combustion occurs by auto-ignition of a lean fuel-air mixture. A possible variant is known here as HCLI method (Homogeneous Charge Late Injection). If such a mixture combustion is performed, the fuel injection thus occurs sufficiently far before the upper dead center of the compression phase, thus leading to a substantially homogeneous fuel-air mixture. Recirculation of exhaust gas can ensure that the combustion temperature remains below the minimum temperature required for NOx formation. Since the homogenization of fuel and air is time-dependent, however, the realization of this method is limited depending on speed and load, since the emission of particulates increases in the case of insufficient homogenization.

U.S. Pat. No. 6,338,245 B1 describes a diesel engine operating according to the HCLI method, in which the combustion temperature and the ignition delay are set in such a way that in the lower and middle part-load range the combustion temperature lies below the NOx formation temperature and the air ratio is above the value relevant for the formation of exhaust particulates. The combustion temperature is controlled by changing the exhaust gas recirculation rate and the ignition delay by the fuel injection time. The combustion temperature is lowered to such an extent under medium and high load that both NOx as well as exhaust particulate formation is avoided. The disadvantageous aspect is that especially in the middle part-load range a low air ratio occurs in combination with low combustion temperatures and therefore a low efficiency needs to be accepted.

U.S. Pat. No. 6,158,413A describes a direct-injection diesel engine in which the fuel injection is set not before the upper dead center of the compression and in which the oxygen concentration in the combustion chamber is reduced by exhaust gas recirculation. This operating method is also known here as HPLI method (Highly Premixed Late Injection). As a result of the temperature level decreasing after the upper dead center (in contrast to a conventional injection before the upper dead center) and the quantity of recirculation exhaust gas which is increased as compared with the conventional operating method, the ignition delay is longer than in the so-called diffusion combustion. The low temperature level which is controlled by the exhaust gas recirculation rate ensures that the combustion temperature remains beneath the value relevant for the NOx formation. A favorable mixture formation is achieved as a result of the large ignition delay caused by the later injection time, leading to a clear reduction of the local lack of oxygen in the combustion of the mixture, thus leading to a reduction in the formation of particulates. The late shifting of the combustion progress leads to a reduction of the maximum temperature, but also simultaneously leads to an increase of the mean temperature at a given later crank angle, which thus increases the exhaust particulate combustion. The displacement of the combustion into the expansion cycle further leads to a pressure increase rate in the cylinder which does not exceed the permissible level, this being in combination with the high exhaust gas recirculation rate despite larger premixed fuel quantity owing to the long ignition delay and a consequently higher maximum combustion rate. The adverse efficiency in the lower part-load range is disadvantageous.

It is known from the Austrian utility model application GM 702/2002 to operate a diesel engine in a first operating range in the HCLI mode allocated to the first lower part-load and in a second operating range in the HPLI mode allocated to the second middle part-load. Minimum nitrogen oxide and exhaust particulate emissions and a higher efficiency can be achieved especially in the lower and middle part-load ranges. A conventional combustion of diesel is performed under full load however, although higher NOx and exhaust particulate emissions occur than under alternative combustion methods.

SUMMARY OF THE INVENTION

It is the object of the present invention to avoid such disadvantages and to reduce the emissions and the fuel consumption in a hybrid vehicle.

This is achieved in accordance with the invention in such a way that the internal combustion engine is operated with an alternative diesel combustion method in at least one load range of the vehicle and the electric driving machine is switched in.

It is provided in this process that the internal combustion engine is operated under alternative combustion in at least one operating range in an HCLI mode with substantially homogeneous mixture combustion and later fuel injection (in comparison with other methods with homogeneous combustion, e.g. the HCCI method (Homogeneous Charge Compression Ignition)), with the fuel injection being started in a range of between approximately 50° to 5° of crank angle before the upper dead center of the compression phase. It can further be provided that the internal combustion engine is operated under alternative combustion in at least one operating range in an HPLI mode with low-temperature mixture combustion and even later injection than in the HCLI mode, with the fuel injection being started in a range of between 2° of crank angle before the upper dead center and approximately 20° of crank angle after the upper dead center of the compression phase. In comparison with conventional diesel combustion, the injection of the fuel occurs relatively early.

Preferably, the internal combustion engine is operated in the HCLI mode at low part-load and in the HLPI mode at middle part-load.

In order to lower emissions and the fuel consumption in the load range above the HCLI mode, it is especially advantageous when the electric driving machine is switched in in at least one load range which lies above the load range of the HCLI mode and/or above the load range of the HPLI mode. It can thus be achieved that in a higher part-load range the internal combustion engine can be operated with alternative combustion and thus the lowest possible fuel consumption and emissions. It is especially possible to decisively reduce NOx emissions and exhaust particulate emissions, e.g. in the NEDC drive cycle (New European Drive Cycle).

In a further embodiment of the invention it can be provided that the electric driving machine is switched in in at least one transient operating range, with the electric driving machine preferably being cut off again once the internal combustion engine reaches a stationary operating point within the load range of the HCLI mode or the HPLI mode and/or once the required change speed of the internal combustion engine falls below a permissible quantity. The occurrence of emission peaks and/or noise peaks can thus be avoided in transient transition from one operating mode to another. The required change speed (e.g. load change) for the internal combustion engine is also reduced in transient operation within an operating mode (e.g. HCLI mode) by activating the electric driving machine, thus avoiding or reducing the occurrence of emission and/or noise peaks.

It is further advantageous when the electric driving machine is switched in in the upper and/or in the full-load range of the vehicle to the internal combustion engine operated with alternative combustion. This allows reducing the emissions in full-load operation and reducing fuel consumption on the one hand. On the other hand, the internal combustion engine can be provided with a smaller dimensioning because the electric driving machine provides a torque reserve. The effective medium pressure of the internal combustion engine is between 0 and 6 bars in the HCLI mode, preferably between 0 and 5.5 bars. In the HLPI operating range, the effective medium pressure is between 3.5 and 8 bars, preferably between 4 and 7 bars.

In a further embodiment of the invention it can be provided that for the regeneration of a particle filter arranged in the exhaust train of the internal combustion engine the load of the internal combustion engine is increased briefly by means of an electric driving machine, preferably by means of the electric driving machine operated in the manner of a generator, so that the exhaust gas temperature lies in the range required for regeneration. The energy generated with the driving machine is supplied to an energy storage. In addition to heating the particle filter, the same can be provided with an electric heating which is supplied from the electric storage.

A hybrid vehicle with a drive train is suitable for realizing the method which comprises an internal combustion engine driven with diesel fuel and at least one electric driving machine, with the internal combustion engine being capable of being operated with alternative combustion, and an electric driving machine can be switched in in at least one load range of the vehicle of the internal combustion engine which can be operated with alternative combustion.

BRIEF DESCRIPTION OF THE DRAWINGS

The invention is now explained in closer detail by reference to the enclosed drawings, wherein.

DETAILED DESCRIPTION OF THE PREFERRED EMBODIMENTS

Figure 1:
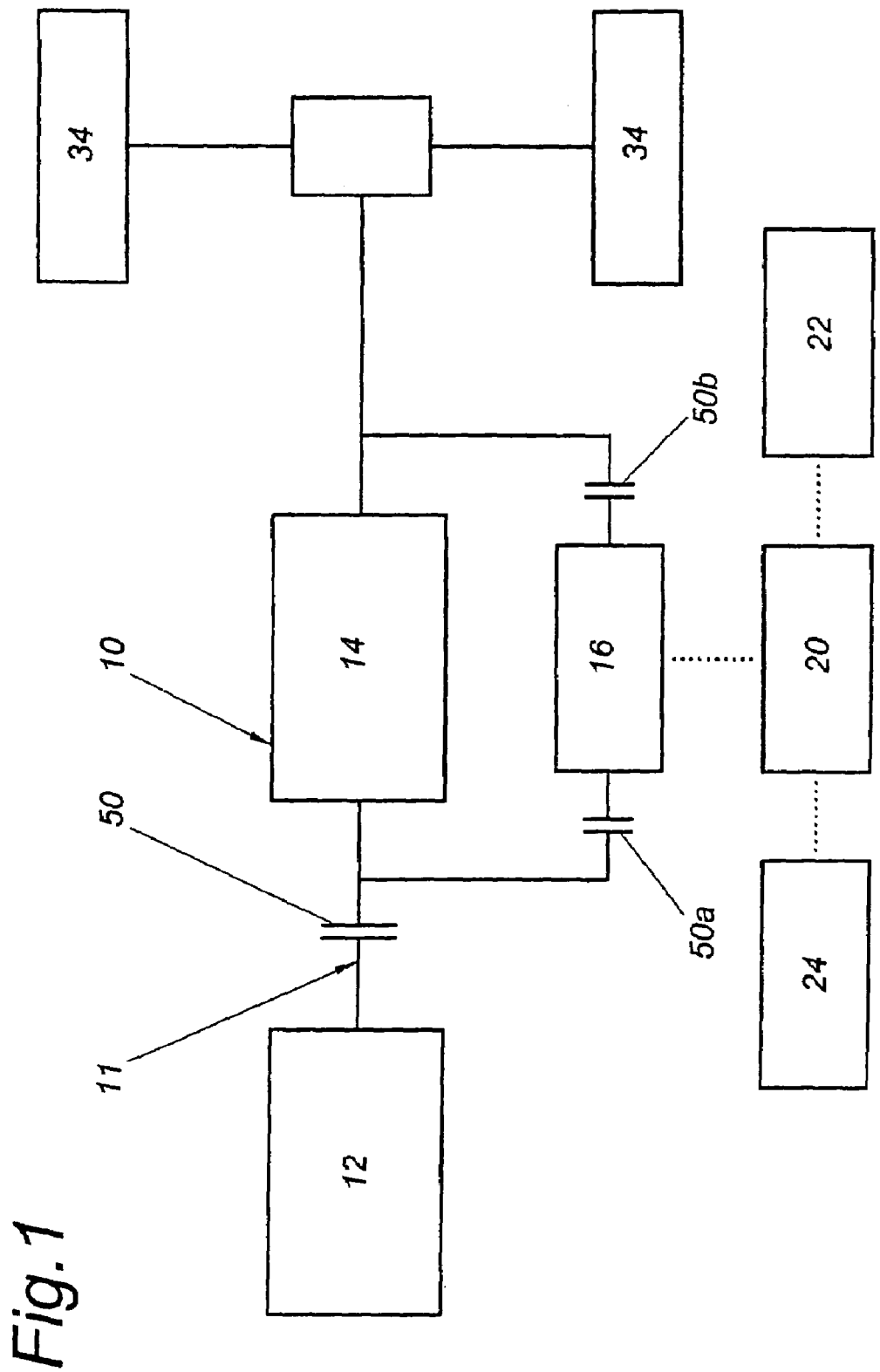
FIG. 1 schematically shows a drive train of a hybrid vehicle for executing the method in accordance with the invention.

FIG. 1 shows the overall configuration of the hybrid drive system 10. The hybrid drive source in the drive train 11 is formed by a diesel engine 12 which is reduced with respect to the basic motorization and which is coupled via a clutch 50 to be actuated in an automated manner with an automatic transmission 14 with six gears for example. An electric driving machine 16 is connected with the automatic transmission 14 by means of engaging and disengaging clutches 50a, 50b, e.g. engaging and disengaging synchronous clutches. The electric driving machine 16, which can be operated both as a generator as well as a motor, has a permanent output of approximately 10 kW in the embodiment and a peak output of approximately 25 kW for 5 seconds. It is triggered by power electronics 20 via 12 volts of battery voltage 22 and via a double-layer capacitor 24 with 42 volts. The electric driving machine 16 can be coupled on the one hand with the drive shaft 30 and on the other hand with the driven shaft 32 of the automatic transmission via an intermediate gear (not shown in closer detail). The driven shaft 32 leads to the driving wheels 34.

Figure 2:
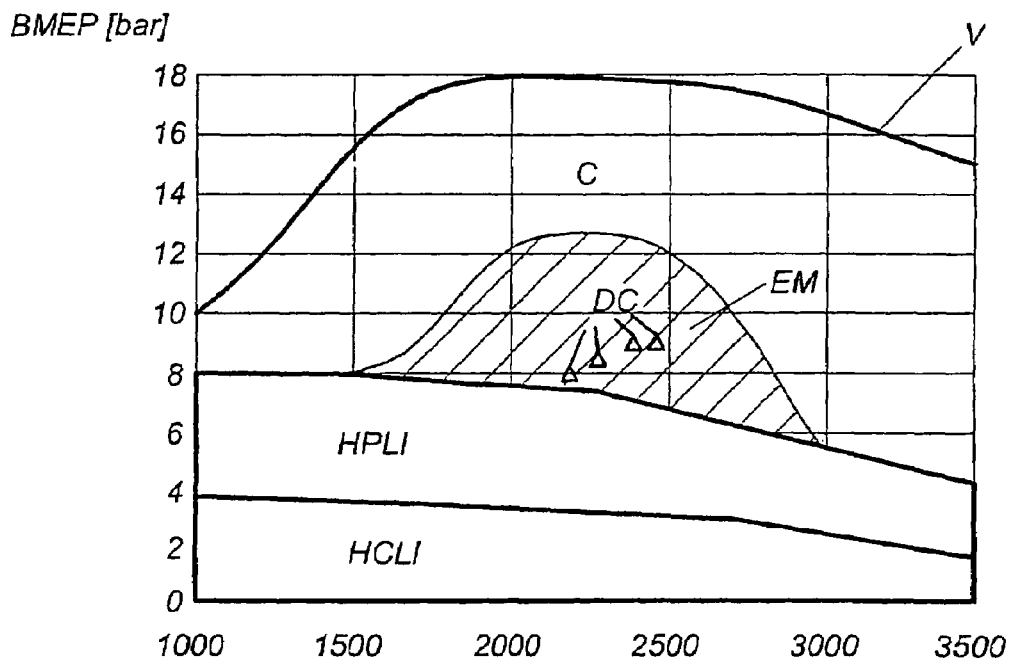
FIG. 2 shows a family of characteristics of the diesel engine.

FIG. 2 shows a family of characteristics of the diesel engine 12, with the medium pressure BMEP being entered over the speed n. In the HCLI range (Homogeneous Charge Late Injection) the start of the injection lies relatively early in the compression cycle (in comparison with conventional diesel combustion), i.e. close to approx. 50° to 5° of crank angle before the upper dead center after the compression cycle, thus making available a long ignition delay for forming a partly homogeneous mixture for a premixed combustion (in comparison with the HCCI method (Homogeneous Charge Compression Ignition), the injection is performed comparatively late). As a result of the distinctive premixing and dilution, extremely low exhaust particulate and NOx emission values can be achieved. The local air ratio clearly lies in the HCLI range above the threshold relevant for the development of exhaust particulates. The high exhaust gas recirculation rate between 50% to 80% ensures that the local combustion temperature always remains below the minimum formation temperature for nitrogen oxide. The injection occurs at a pressure of between 400 and 1000 bars. The long ignition delay ensures that the combustion phase is shifted to the optimal efficiency position about the upper dead center. The combustion focus lies in a range of between −10° to +10° of crank angle after the upper dead center, as a result of which a high efficiency can be achieved. The high exhaust gas recirculation rate which is required for the HCLI mode can be achieved either by external exhaust gas recirculation alone or by a combination of external with internal exhaust gas recirculation through variable valve control. The HCLI range is associated with the low part load, up to approximately 4 to 6 bars.

In the medium operation range between approximately 3.5 to 8 bars of medium pressure BMEP, the internal combustion engine 12 is operated according to the HLPI method (Highly Premixed Late Injection). The main portion of the injection phase is located after the upper dead center of the compression phase. In the HPLI mode, the internal combustion engine 12 is operated with an exhaust gas recirculation rate of between 20% to 40%. The start of the injection lies in a range of between 2° of crank angle before the upper dead center and up to 20° of crank angle after the upper dead center. As a result of the complete separation of the end of the injection and the start of the combustion, a partial homogenization of the mixture with premixed combustion is achieved. The ignition delay is longer due to the temperature level which decreases as compared with the conventional injection before the upper dead center and the quantity of recirculated exhaust gas which is increased as compared with the conventional operating mode. Other means can also be used for extending the ignition delay such as a decrease of the effective compression ratio and/or the intake temperature as well as an increase in the injection pressure and/or an enlargement of the injection hole cross section of the injection nozzle for reducing the injection duration. The short injection duration is required to ensure that the end of the injection is located before the start of the combustion. In this case it is possible to keep the exhaust particulate emissions at a very low level. This can be explained in such a way that the simultaneous occurrence of liquid fuel in the fuel jet and the flame enclosing the jet in a conventional manner is avoided, which thus also prevent the oxidation reactions close to the jet which progress under the lack of air and otherwise lead to the formation of exhaust particulates. The late point of the injection time leads in combination with the relatively long ignition delay to a retarded shifting of the entire combustion progress, as a result of which the cylinder pressure progress is also displaced in a retarded manner and the maximum temperature is lowered, leading to a lower NOx emission.

The retarded displacement of the combustion progress leads to a reduction in the maximum temperature, but simultaneously leads to a rise of the temperature at a given later crank angle, which again promotes the exhaust particulate burn-up.

The displacement of the combustion to the expansion cycle leads to a pressure increase rate in the cylinder which does not exceed the permissible quantity in combination with the high exhaust gas recirculation rate despite the larger premixed fuel quantity owing to the long ignition delay and the consequently higher maximum combustion rate. The high maximum combustion rate which leads to a high degree of constant volume is capable of partly compensating the efficiency loss by retarded displacement of the combustion phase. In order to achieve a high efficiency, the combustion focus should be as close as possible to the upper dead center of the compression phase.

The advantage of the HPLI operating mode is that very low NOx and particle emissions are obtained and that a high exhaust gas temperature is achieved which is advantageous for the regeneration of a particle filter. The local combustion temperature lies slightly above the lower NOx formation temperature. The local air ratio lies mostly above the formation temperature for exhaust particulates. Although exhaust particulates are formed in the HPLI operating mode at the beginning of the combustion process, the exhaust particulates are oxidized by the strong turbulences as a result of the high-pressure injection and by the high temperatures at the end of the combustion process, which thus lead to overall very low exhaust particulate emissions.

In the operating range designated with C, the internal combustion engine is operated conventionally with exhaust gas recirculation rates of between 0% to 30%, with multiple injections being possible. This allows performing a premixed and diffusion combustion. A combination of external and internal exhaust gas recirculation can be used for exhaust gas recirculation. The conventional operating range C reaches from the HPLI operating range to the full load line V. In comparison with HPLI combustion, considerably higher NOx emissions are obtained in conventional combustion, as also higher exhaust particulate emissions. From the standpoint of environmental pollution it would therefore be desirable to operate the internal combustion engine with HPLI combustion also in the upper part-load range.

If a 1.8 liter diesel engine is operated in a middle-class vehicle (test weight 1350 kg) in NEDC driving cycle, the limits of the alternative combustion HCLI, HPLI are exceeded, as is indicated by the points DC in FIG. 2. This leads to a significant increase in the emissions.

Figure 3:
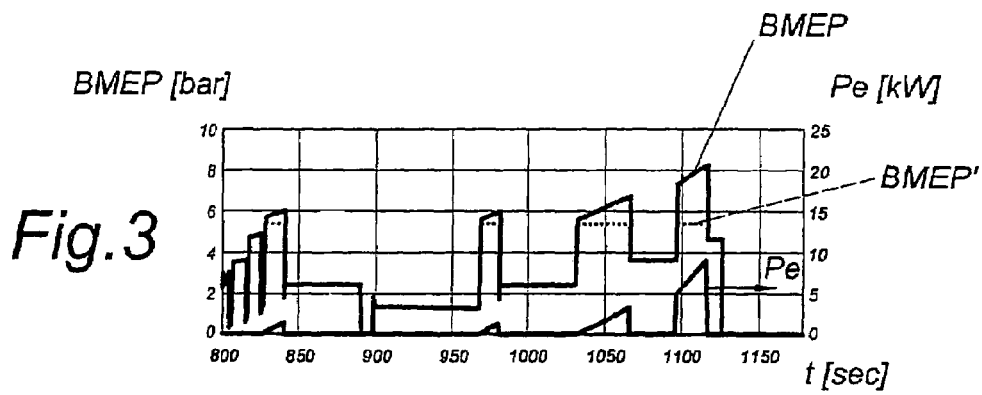
FIG. 3 shows a medium pressure curve during a driving cycle.
Figure 4:
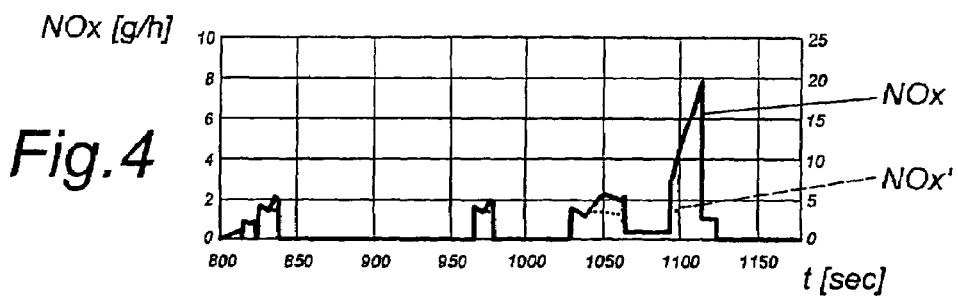
FIG. 4 shows the curve of the NOx emissions during a driving cycle.

FIG. 3 and FIG. 4 schematically show the respective time curve for the medium pressure BMEP and for NOx emissions by unbroken lines for an NEDC driving cycle with transient operation of a diesel engine. The illustration shows that emissions rise strongly once dynamically leaving the range of alternative combustion. This leads to an increase in the average and total emissions.

This can be avoided when the electric driving machine 16 is used for supporting the diesel engine 12 for short dynamic phases. The internal combustion engine 12 is held in the range of alternative combustion, e.g. in the HPLI mode. Although the specific consumption of the internal combustion engine 12 is thus slightly higher in comparison with conventional combustion, but in the overall balance this strategy leads to a reduction of the NOx emissions in the amount of approximately 20% and, as long as only recuperated energy is used for supporting the drive, a reduction of the consumption of approximately 14%.

FIGS. 3 and 4 show the operation of the internal combustion engine 12 with support of the electric driving machine 16 by the dotted lines BMEP' and NOx'. FIG. 3 further shows the power requirement $P_e$ of the electric driving machine. It can clearly be seen that NOx peaks can be avoided in the case of electromotive support in transient transitions between two mutually different operating ranges.

Figure 5:
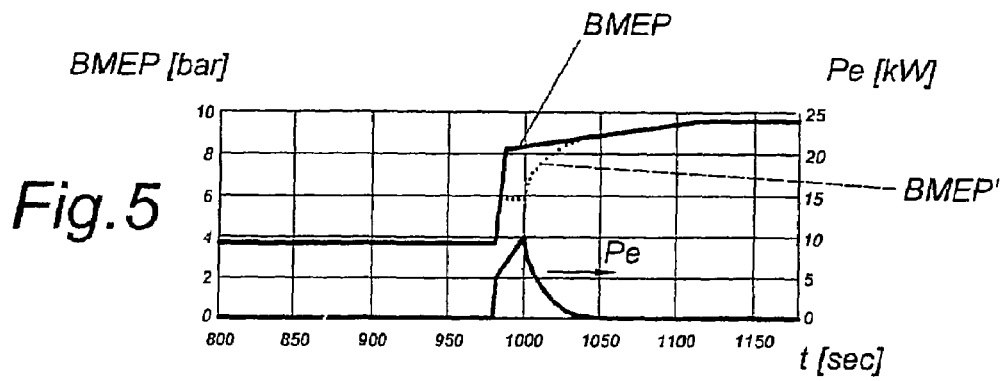
FIG. 5 shows the medium pressure curve during an acceleration process.
Figure 6:
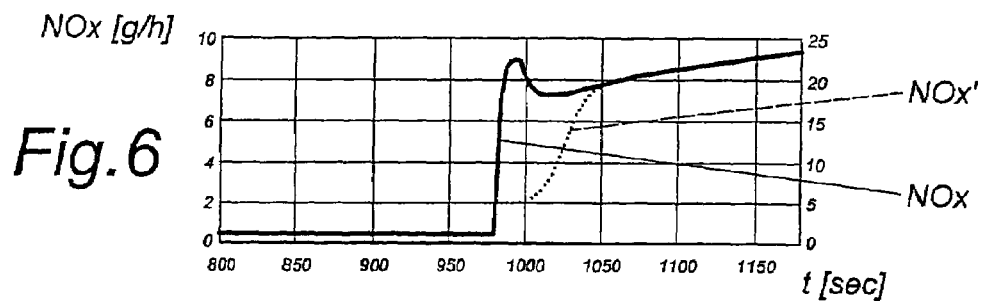
FIG. 6 shows the NOx curve during an acceleration process.

If, as is shown in FIGS. 5 and 6, the increase in the load is demanded on a longer basis by the driver, the moment of the electric driving machine 16 is reduced after a specific period of time and thus a smooth transition between the range of alternative combustion HCLI, HPLI and conventional combustion C is achieved. The emissions and/or the combustion noise can thus also be clearly reduced because a control-induced overshooting of the NOx emissions is avoided in the dynamic transition between the different combustion ranges. The unbroken lines BMEP, NOx in FIGS. 5 and 6 again show the operation without electromotive support. The dotted lines BMEP", NOx" show the operation of the diesel engine with electromotive support.

Figure 7:
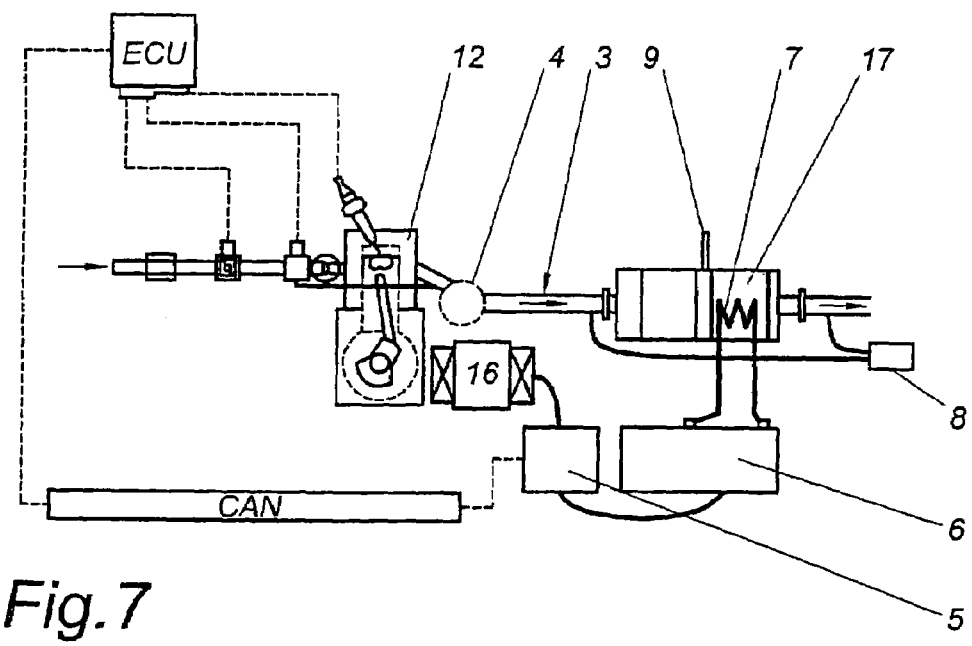
FIG. 7 schematically shows an exhaust gas train of the hybrid vehicle.

FIG. 7 schematically shows the drive train of the vehicle with the diesel combustion engine 12 and the electric driving machine 16. In the exhaust gas train 3 of the internal combustion engine 12 there is a particle filter 17 downstream of an exhaust gas turbocharger 4. Particle filter regeneration is activated once an increased particle loading of the particle filter 17 is detected by means of a differential pressure measuring instrument 8 and a temperature sensor 9. In order to increase the exhaust gas temperature, an additional load is applied to the internal combustion engine 12 by the electric driving machine 16, with the electric driving machine 16 being operated in the manner of a generator. The applied energy can thus partly be regained again. The energy storages 5, 6 of the vehicle are emptied as far as permitted prior to regeneration in order to load the internal combustion engine 12 with the maximum resistance moment during the regeneration and to fill the energy storages 5, 6 again. In addition or as an alternative thereto, the obtained electric energy can be used for heating the particle filter 17 by means of the resistance heating 7. The regeneration is controlled and monitored by the electronic control unit ECU via the vehicle-internal control network CAN.

The invention is not limited to any specific hybrid drive system and can advantageously be used both in serial and parallel hybrid drives, both in connection with manual as well as automatic or semi-automatic transmissions.

The invention claimed is:

1. A method for operating a hybrid vehicle with a drive train which comprises an internal combustion engine driven by diesel fuel and at least one electric driving machine, wherein the internal combustion engine is operated with an alternative diesel combustion method in at least one operating range of the vehicle and the electric driving machine is switched in, wherein the internal combustion engine is operated under alternative combustion in at least one operating range in an HCLI mode with substantially homogeneous mixture combustion and later fuel injection, with the fuel injection being started in a range of between approximately 50° to 5° of crank angle before the upper dead center of the compression phase, wherein the internal combustion engine is operated under alternative combustion in at least one operating range in an HPLI mode with low-temperature mixture combustion and even later injection than in the HCLI mode, with the fuel injection being started in a range of between 2° of crank angle before the upper dead center and approximately 20° of crank angle after the upper dead center of the compression phase, wherein the electric driving machine is switched in in at least one transient operating range and wherein the electric driving machine is cut off again once the internal combustion engine reaches a stationary operating point within the load range of the HCLI mode or the HPLI mode.

2. A method according to claim 1, wherein the HCLI mode is associated with the lower part load.

3. A method according to claim 1, wherein the HPLI mode is associated with the medium part load.

4. A method according to claim 1, wherein the electric driving machine is switched in in a load range which lies above the load range of the HCLI mode and/or above the load range of the HPLI mode.

5. A method according to claim 4, wherein the electric driving machine is switched in in the upper and/or in the full-load range of the vehicle to the internal combustion engine operated with alternative combustion.

6. A method according to claim 1, wherein effective medium pressure of the internal combustion engine is between 0 and 5.5 bars.

7. A method according to claim 1, wherein the effective medium pressure in the HPLI mode is between 3.5 and 8 bars.

8. A method according to claim 1, wherein for the regeneration of at least one particle filter arranged in the exhaust train of the internal combustion engine the load of the internal combustion engine is increased briefly by means of the electric driving machine operated in the manner of a generator.

9. A method according to claim 8, wherein the energy generated with the driving machine is supplied to an energy storage.

10. A method according to claim 8, wherein the energy generated with the driving machine is used for heating the particle filter.

11. The method according to claim 1, wherein the electric driving machine is cut off again once a required change speed of the internal combustion engine falls below a permissible quantity.

12. The method according to claim 1, wherein an effective medium pressure of the internal combustion engine is between 0 and 6 bars in the HCLI mode.

13. The method according to claim 1, wherein the effective medium pressure in the HPLI mode is between 4 and 7 bars.

* * * * *